United States Patent
Alfiad et al.

(10) Patent No.: US 9,337,921 B2
(45) Date of Patent: May 10, 2016

(54) METHOD AND APPARATUS FOR MONITORING MECHANICAL FIBER STRESS OF OPTICAL FIBER SPANS

(71) Applicant: ADVA Optical Networking SE, Meiningen (DE)

(72) Inventors: Mohammad Alfiad, Duluth, GA (US); Mark Filer, Suwanee, GA (US); Ted Rabenko, Cumming, GA (US); Sorin Tibuleac, Johns Creek, GA (US)

(73) Assignee: ADVA Optical Networking SE, Meiningen (DE)

( * ) Notice: Subject to any disclaimer, the term of this patent is extended or adjusted under 35 U.S.C. 154(b) by 174 days.

(21) Appl. No.: 14/079,887

(22) Filed: Nov. 14, 2013

(65) Prior Publication Data

US 2015/0131988 A1    May 14, 2015

(51) Int. Cl.
| | | |
|---|---|---|
| H04B 10/08 | (2006.01) | |
| H04B 10/077 | (2013.01) | |
| H04B 10/27 | (2013.01) | |
| H04B 10/25 | (2013.01) | |
| H04J 14/02 | (2006.01) | |
| G01M 11/08 | (2006.01) | |
| H04B 10/073 | (2013.01) | |

(52) U.S. Cl.
CPC ......... *H04B 10/0775* (2013.01); *G01M 11/088* (2013.01); *H04B 10/0771* (2013.01); *H04B 10/25* (2013.01); *H04B 10/27* (2013.01); *H04J 14/02* (2013.01); *H04B 10/073* (2013.01); *H04B 10/077* (2013.01)

(58) Field of Classification Search
None
See application file for complete search history.

(56) References Cited

U.S. PATENT DOCUMENTS

| 4,778,248 A | * | 10/1988 | Arzur | G02B 26/04 |
| --- | --- | --- | --- | --- |
| | | | | 250/227.21 |
| 5,109,443 A | * | 4/1992 | Hill | H04B 10/85 |
| | | | | 250/227.14 |
| 5,381,005 A | * | 1/1995 | Chazelas | G01M 11/083 |
| | | | | 250/227.19 |
| 6,765,659 B1 | * | 7/2004 | Bhatnagar et al. | 356/73.1 |
| 7,153,034 B2 | * | 12/2006 | Sasaoka | H04B 10/25253 |
| | | | | 356/73.1 |
| 8,406,620 B2 | * | 3/2013 | Khermosh | H04B 10/071 |
| | | | | 398/13 |
| 2012/0224846 A1 | * | 9/2012 | Swanson | H04B 10/0705 |
| | | | | 398/13 |

FOREIGN PATENT DOCUMENTS

| WO | 2012/030814 A2 | 3/2012 |
| WO | 2012/030814 A3 | 3/2012 |

OTHER PUBLICATIONS

Reddy, M. et al., Imbedded Optical Fiber Sensor of Differential Strain in Composite, BNSDOCID:,XP_55177742A_I_>; Dec. 1987.*
Richards, D. et al., "Detecting Fiber Cuts in a WDM Ring With Optical Protection Switching: Simulation and Experiment"; ECOC98, Sep. 20-24, 1998, Madrid, Spain; 2 pages.
(Continued)

*Primary Examiner* — Ken Vanderpuye
*Assistant Examiner* — Jai Lee
(74) *Attorney, Agent, or Firm* — Westman, Champlin & Koehler, P.A.

(57) ABSTRACT

The length of the optical fiber section under tension expands by a certain amount that is proportional to the level of tension applied to it. Monitoring the variations in the phase of the arriving signal allows to discover a fiber that is subject to a certain level of mechanical tension. With the method and apparatus according to the present invention it is possible to protect optical communication channels against failures in an optical transmission fiber that are caused by any kind of mechanical disturbances.

17 Claims, 8 Drawing Sheets

(56) References Cited

OTHER PUBLICATIONS

Richards, D. et al., "Method for detecting fiber cuts in a WDM ring with saturated EDFAs"; Proc. OFC 1999, paper FJ4; 4 pages.
Li, Chung-Sheng et al., "Automatic Fault Detection, Isolation, and Recovery in Transparent All-Optical Networks"; Journal of Lightwave Technology, vol. 15, No. 10, Oct. 1997; 10 pages.
Reddy, M. et al., "Imbedded Optical Fiber Sensor of Differential Strain in Composites"; BNSDOCID:<XP_55177742A_I_>; Dec. 31, 1987; 6 pages.
Extended European Search Report for European Patent Application No. 14177484.4-1860, dated Apr. 8, 2015, 9 pages.
Mendez et al., "Specialty optical fibers handbook"; p. 751; provided by associate Sep. 3, 2015; 1 page.

* cited by examiner

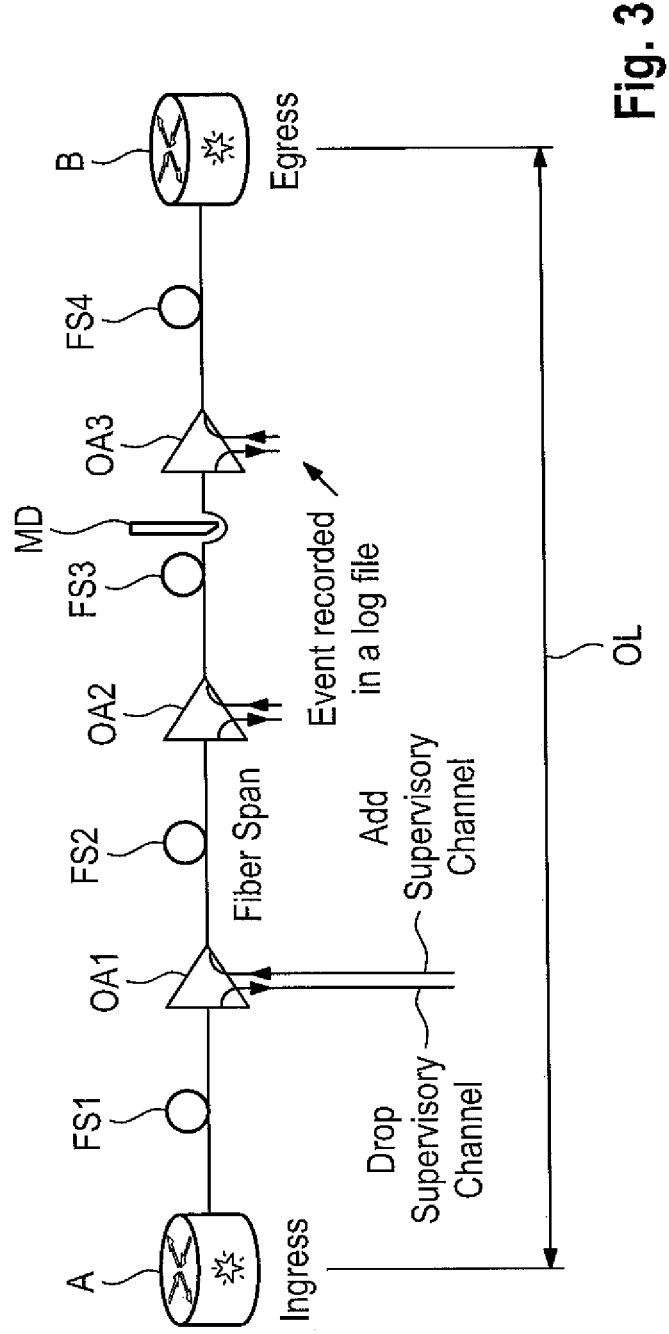

Length=L

Length=L+ΔL

METHOD AND APPARATUS FOR MONITORING MECHANICAL FIBER STRESS OF OPTICAL FIBER SPANS

TECHNICAL BACKGROUND

The invention relates to a method and apparatus for monitoring mechanical fiber stress of optical fiber spans within an optical network, and in particular to a method and apparatus for predicting an optical fiber cut event.

An optical network comprises a plurality of network elements connected to each other via optical links. Each optical link can be composed of one or several optical fiber spans comprising optical fibers. Optical fiber spans can be subject to mechanical stress. For instance, due to excavation activities, fibers of one or several fiber spans within a fiber link connecting two network elements of the network can be stretched and are at a risk of being cut by mechanical effects. Conventional techniques used nowadays for predicting fiber cuts are based on monitoring for any degradation in the bit error rate of a signal received by a receiver and/or a drop in the optical power of the received signal. However, these conventional techniques are unreliable in predicting possible fiber cuts and therefore cannot prevent preemptively any traffic loss in the data network. Conventional techniques may provide unreliable results in networks where other artifacts, unrelated to a fiber break event, degrade the signal power or add noise to the channel.

Accordingly, there is a need for a method and apparatus which allow monitoring of the mechanical stress experienced by optical fiber spans within an optical network for the purpose of predicting possible optical fiber cut events.

SUMMARY OF THE INVENTION

The invention provides according to a first aspect a method for monitoring mechanical fiber stress of optical fiber spans within an optical network comprising
monitoring continuously a timing phase of a received optical signal transported through said optical fiber spans,
deriving a mechanical fiber stress in said optical fiber spans on the basis of an observed phase shift of said timing phase within a predetermined observation period of time.

In a possible embodiment of the method according to the first aspect of the present invention, a critical mechanical fiber stress indicating an imminent fiber cut is detected if the observed phase shift of the extracted timing phase exceeds a first threshold value within the predetermined observation period of time.

In a further possible embodiment of the method according to the first aspect of the present invention, the timing phase of the received optical signal is extracted by a clock recovery block of a receiver receiving said optical signal transported through said optical fiber spans.

In a further possible embodiment of the method according to the first aspect of the present invention, if an observed phase shift of said timing phase within the predetermined observation period of time exceeds the first threshold value, then other indicators are evaluated to confirm an imminent fiber cut in the optical fiber spans.

In a possible embodiment of the method according to the first aspect of the present invention, the other indicators comprise
a bit error ratio, BER, of said received optical signal,
a chromatic dispersion,
a polarization mode dispersion,
an optical signal power of the received optical signal,
a polarization dependent loss, a signal to noise ratio and/or a phase of other WDM channels going through the same transmission link.

In a still further possible embodiment of the method according to the first aspect of the present invention, if a critical mechanical stress in one of the optical fiber spans of a link between two network elements of the optical network is detected a signal is sent by the receiver to switch data traffic away from the affected path comprising the optical link with the affected optical fiber span to a protection signal path. Depending on network topology, the mechanical overstress signal may be processed by external routing functions to move traffic to another path or by an internal switching means to replace the signal path with an alternate path.

In a still further possible embodiment of the method according to the first aspect of the present invention, if a critical mechanical stress in one of the optical fiber spans of a link between two network elements of said optical network is detected, a message is sent by said receiver to perform a shutdown of the affected signal path comprising the optical link with the affected optical fiber span.

In a further possible embodiment of the method according to the first aspect of the present invention, a critical mechanical stress in the affected optical fiber span of an optical link between two network elements of said optical network is detected if an observed phase shift is equivalent to a delay of several data symbols within a predetermined period.

In a further possible embodiment of the method according to the first aspect of the present invention, the optical signal is transported through the optical fiber spans in a wavelength division multiplexing, WDM, channel.

In a further possible embodiment of the method according to the first aspect of the present invention, the optical signal is transported through said optical fiber spans in an optical supervisory channel, OSC, and comprises a predetermined monitor wavelength.

In a further possible embodiment of the method according to the first aspect of the present invention, instances of the monitored mechanical fiber stress for different optical fiber spans are recorded and evaluated to localize an affected optical fiber span of an optical link between network elements of said optical network.

In a still further possible embodiment of the method according to the first aspect of the present invention, the instances of the monitored mechanical fiber stress are recorded if the observed phase shift of the extracted timing phase within the predetermined observation period of time exceeds a second threshold value.

In a possible embodiment of the method according to the first aspect of the present invention the timing phase of said received optical signal is continuously monitored and observed changes to the phases are reported to derive the mechanical stress in said optical fiber spans on the basis of the observed phase shift.

In a possible embodiment of the method according to the first aspect of the present invention a phase difference of the received optical signal is measured against a fixed reference signal over a sample interval to provide a phase shift represented by a time difference between the received optical signal and the reference signal.

The invention further provides according to a second aspect an optical network comprising
a plurality of network elements connected to each other via optical links each being composed of one or more optical fiber spans,
wherein an extracted timing phase of a received optical signal transported through optical fiber spans of said optical network is continuously monitored and a mechanical stress in said optical fiber spans is derived on the basis of an observed phase shift of the extracted timing phase within a predetermined observation period of time.

In a possible embodiment of the optical network according to the second aspect of the present invention, the optical links comprise optical fiber spans connected to each other in series with or without amplifiers.

In a further possible embodiment of the optical network according to the second aspect of the present invention, the monitored optical signal is an optical signal which is transported through said optical fiber spans in a wavelength division multiplex, WDM, channel.

In a further possible embodiment of the optical network according to the second aspect of the present invention, the monitored optical signal is a specific optical signal transported through said optical fiber spans in an optical supervisory channel, OSC, and comprises a predetermined monitor wavelength.

The invention further provides according to a third aspect an apparatus for monitoring mechanical fiber stress of optical fiber spans within an optical network, said apparatus comprising a monitoring unit adapted to monitor continuously a timing phase of a received optical signal transported through said optical fiber spans, and a calculation unit adapted to detect a mechanical fiber stress in said optical fiber spans on the basis of an observed phase shift of the timing phase within a predetermined observation period of time.

BRIEF DESCRIPTION OF THE FIGURES

In the following, possible embodiments of the different aspects of the present invention are described in more detail with reference to the enclosed figures.

FIG. 3 shows a diagram of an exemplary implementation of a fiber link between two optical network elements to illustrate a possible embodiment of the method and apparatus according to the present invention;

DETAILED DESCRIPTION OF EMBODIMENTS

Figure 1:
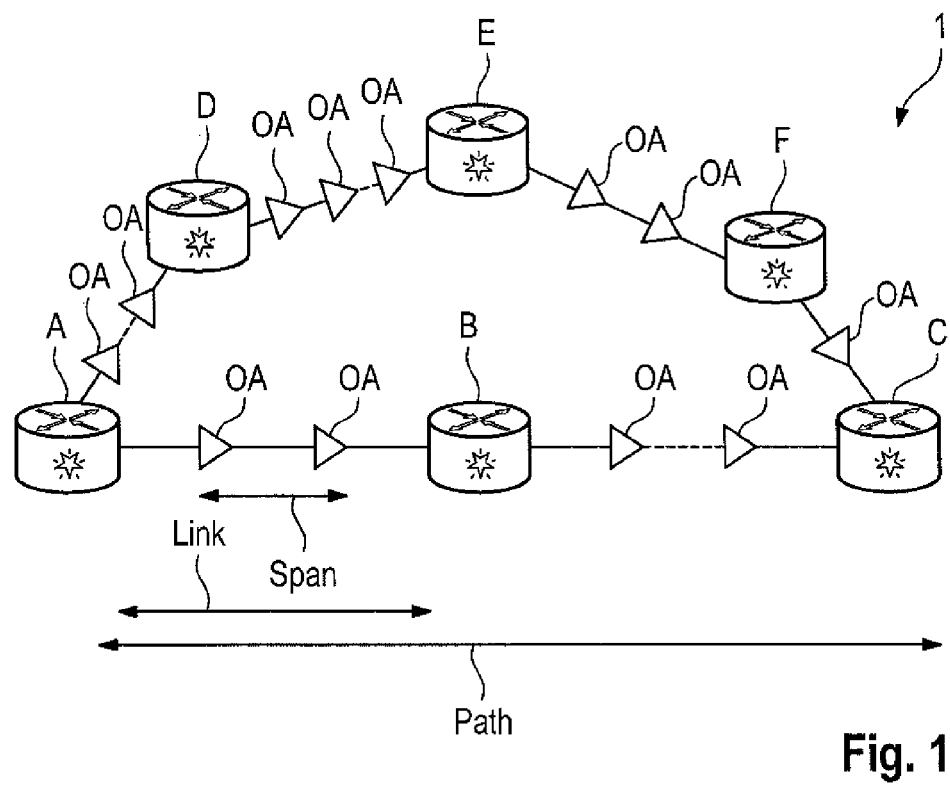
FIG. 1 shows a diagram of an exemplary embodiment of an optical network according to the present invention.

FIG. 1 shows an exemplary embodiment of an optical network 1 according to the present invention. The optical network 1 comprises a plurality of network elements connected to each other via optical links each being composed of one or more optical fiber spans. In the shown simple exemplary embodiment of the optical network 1, the network comprises network elements A, B, C, D, E, F. The optical network elements A to F can be formed by interfaces to routers, and are therefore the only locations in the optical network 1 where an optical signal can be either generated or terminated. The network elements A to F are connected together through optical fiber links which are composed of one or more optical fiber spans with or without amplification. For instance, network element A is connected to the network element B via an optical fiber link AB. The link is composed of one or several optical fiber spans, wherein after each of the spans the optical signal is regenerated either optically or electronically. The set of optical links that does connect an ingress network element and an egress network element in the optical network 1 forms a signal path. For instance, in the optical network 1 as shown in FIG. 1, there is a signal path ABC connecting network elements A and C. Such a working signal path connects an ingress network element such as network element A with an egress network element such as network element C. For every working signal path, a corresponding protection signal path can be provided. This protection signal path is partially or completely disjoint from the working signal path to be protected and shares the same ingress and egress points. In the example shown in FIG. 1, the protection signal path ADEFC is provided to protect the working signal path ABC.

In the optical network 1 according to the present invention as illustrated in FIG. 1, an extracted timing phase of a received optical signal transported through optical fiber spans of said optical network 1 is continuously monitored and a mechanical stress in said optical fiber spans is derived on the basis of an observed phase shift of the extracted timing phase within a predetermined observation period of time. Optical links do comprise optical fiber spans connected to each other in series via optical amplifiers OA as shown in FIG. 1. In a further embodiment, the monitored optical signal is an optical signal which is transported through said optical fiber spans in a wavelength division multiplexing, WDM, channel. In an alternative embodiment of the optical network 1 according to the present invention, the monitored optical signal can also be a specific optical signal transported through said optical fiber spans in an optical supervisory channel, OSC, and can comprise a predetermined monitor wavelength. Although none of the regeneration nodes along the link can form an ingress or egress point, a supervisory optical channel, OSC, can be optionally generated and terminated at these regeneration nodes or amplifiers. Optical signals can co-propagate together with the signals in the optical channels in the supervisory optical channels, OSC, within the same other fiber span and they can be responsible for the communication between the different network nodes and optionally for monitoring the performance of each individual optical fiber span.

In a possible embodiment, a critical mechanical fiber stress indicating an imminent fiber cut of an optical fiber within an optical fiber span can be detected, if the observed phase shift of the extracted timing phase exceeds a first threshold value, TH1, within a predetermined observation period of time. In a possible implementation, the first threshold value, TH1, is adjustable. Further, in a possible implementation, the predetermined observation period can also be adjustable. In a possible embodiment, the timing phase of the received optical signal can be extracted by a clock recovery block of a receiver of the network element receiving the optical signal transported through the optical fiber spans. If an observed phase shift of the timing phase within the observation period of time exceeds the first threshold value, TH1, then other indicators are evaluated in a possible embodiment to confirm an imminent fiber cut in the optical fiber spans. These other indicators can comprise in a possible embodiment a bit error rate, BER, of the received optical signal, a detected chromatic dispersion, a detected polarization mode dispersion, an optical signal power of the received optical signal, and/or a polarization dependent loss.

In a possible embodiment of the optical network 1 as illustrated in FIG. 1, if a critical mechanical stress in one of the optical fiber spans of a link between two network elements of the optical network 1 is detected, a control plane, CP, is notified by the respective receiver to switch data traffic away from the affected path comprising the optical link with the affected optical fiber span to a protection signal path. Alternatively, the receiver can notify the control plane, CP, to perform a shutdown of the affected signal path comprising the at least one optical link with the affected optical fiber span. For instance, if a receiver in network element B of the optical network 1 as illustrated in FIG. 1 detects a critical mechanical stress in one of the optical fiber spans of the link AB connecting the network element A and B of the optical network 1, the receiver of network element B can in a possible exemplary embodiment notify the control plane, CP, of the network 1 about the detected critical mechanical stress. The control plane, CP, can then either switch data traffic away from the affected signal path, SP, to a protection signal path, PSP, or perform a shutdown of the affected signal path, SP. For instance, the control plane, CP, can in the given example switch data traffic away from the affected signal path ABC comprising the optical link with the affected optical fiber span to the protection signal path ADEFC. Alternatively, the control plane, CP, can shutdown the affected signal path ABC comprising the optical link with the affected optical fiber span. If an imminent fiber cut of an optical fiber span is detected, the control plane, CP, can be notified by the respective receiver and switch data traffic away from the affected signal path comprising the respective optical fiber span to a protection signal path, PSP. In a possible embodiment, a critical mechanical stress in the affected optical fiber span of an optical link between two network elements of the optical network 1 is detected, if an observed phase shift is equivalent to a delay of several data symbols within a predetermined time period. In a possible embodiment, the timing phase of the received optical signal is continuously monitored and observed changes to the phases are reported to derive the mechanical stress in the optical fiber spans on the basis of the observed phase shift.

In a further possible embodiment, the phase difference of the received optical signal is measured against a fixed reference signal over a sample interval to provide a phase shift represented by a time difference between the received optical signal and the reference signal. In a possible implementation, the error signal can be represented as a time difference between the reference and the incoming signal and may be accumulated over multiple sample intervals to determine a threshold of fiber overstress conditions. In a possible embodiment, an optical signal is monitored that is transported through the optical fiber spans in a wavelength division multiplexing, WDM, channel. In an alternative embodiment, an optical signal is monitored which is transported through the optical fiber spans in an optical supervisory channel, OSC, and comprises a predetermined monitor wavelength.

In a further possible embodiment, instances of the monitored mechanical fiber stress for different optical fiber spans are recorded and evaluated to localize an affected optical fiber span of an optical link between network elements of the optical network 1. In a possible embodiment, the instances of the monitored mechanical fiber stress are recorded only, if the observed phase shift of the extracted timing phase within the predetermined observation period of time exceeds a second threshold value, TH2. The second threshold value, TH2, can also be adjustable. In a possible embodiment, the first and second threshold values TH1, TH2 are adjusted by the control plane, CP, of the network 1.

Figure 2:
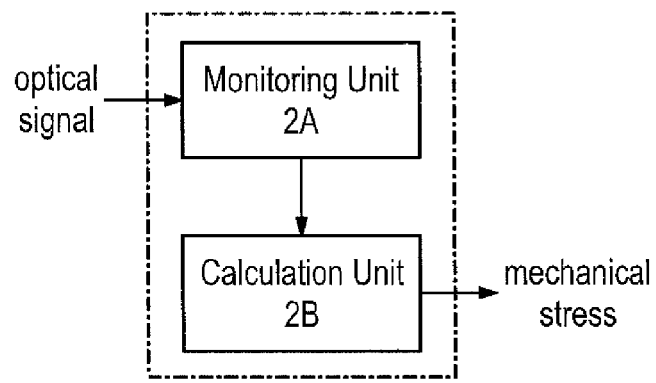
FIG. 2 shows a block diagram of a possible embodiment of an apparatus for monitoring mechanical fiber stress of optical fiber spans within an optical network according to an aspect of the present invention.

FIG. 2 shows a block diagram of a possible embodiment of an apparatus 2 for monitoring mechanical fiber stress of optical fiber spans within an optical network 1 according to the present invention. As can be seen in FIG. 2, the apparatus 2 comprises a monitoring unit 2a and a calculation unit 2b. The monitoring unit 2a is adapted to monitor continuously a timing phase of a received optical signal transported through said optical fiber spans. The calculation unit 2b is adapted to detect a mechanical fiber stress in the optical fiber spans on the basis of an observed phase shift of the timing phase within a predetermined observation period of time. The monitoring apparatus 2 can be integrated in a receiver of a data network element such as data network elements A to F in the optical network 1 as illustrated in FIG. 1. In a further possible embodiment, the apparatus 2 can be formed by a separate unit which can be connected to a data network element such as data network elements A to F of the network 1. For instance, the apparatus 2 can be connected at the receiving side of a data network element such as data network element B for monitoring an optical signal received from another network element such as network element A via a link such as link AB. In a possible embodiment, the calculation unit 2b can also evaluate the detected mechanical fiber stress and notify a control plane, CP, if the detected mechanical fiber stress is critical. In a possible embodiment, the calculation unit 2b detects a critical mechanical fiber stress indicating an imminent fiber cut, if the observed phase shift of the extracted timing phase exceeds a first threshold value, TH1, within a predetermined observation period. In a further possible implementation, the calculation unit 2b can evaluate other indicators to confirm an imminent fiber cut in the optical fiber spans, if an observed phase shift of the timing phase within the predetermined observation period exceeds this first threshold value, TH1. In a possible embodiment, the calculation unit 2b can notify the control plane, CP, if a critical mechanical stress of one of the optical fiber spans of an optical link between two network elements of the optical network 1 is detected. In a possible embodiment, instances of the monitored mechanical fiber stress for different optical fiber spans are received and evaluated by the calculation unit 2b to localize an affected optical fiber span of an optical link between network elements of the optical network 1. In a possible embodiment, instances of the monitored mechanical fiber stress are recorded and memorized in a memory unit of the apparatus 2. In a possible implementation, the instances are only recorded, if the observed phase shift of the timing phase within the predetermined observation period exceeds a second threshold value, TH2. In a possible embodiment, the apparatus 2 as illustrated in FIG. 2 comprises an interface for adjusting a first and/or a second threshold value.

FIG. 3 shows a diagram for illustrating a possible embodiment of the method and apparatus according to the present invention. FIG. 3 shows a fiber link between two network elements, A, B, of an optical network 1. In the shown exemplary embodiment, the first network element A forms an ingress node and network element B forms an egress node connected to each other via an optical link, OL, comprising several optical fiber spans. The optical link is composed of several optical fiber spans, FS1, FS2, FS3, FS4, connected to each other in series via optical amplifiers, OA1, OA2, OA3.

In the shown example of FIG. 3, the optical signal path, SP, comprises a single optical link, OL, connecting network element A and network element B. The optical link comprises four fiber spans FS1, FS2, FS3, FS4 connected to each other via optical amplifiers OA1, OA2, OA3. In the embodiment illustrated in FIG. 3, phase delays caused by mechanical fiber stress can be detected by the use of an optical supervisory channel, OSC. In this embodiment, the optical signal monitored by the monitoring unit $2a$ of the apparatus 2 is transported through fiber spans FSi in an optical supervisory channel, OSC, and does comprise a predetermined monitor wavelength. In the embodiment of FIG. 3, the signal transported in the optical supervisory channel, OSC, comprising a predetermined monitoring wavelength with appropriate modulation is generated at each amplifier, OA, and at each network element AB and is transmitted over single fiber spans to the neighboring amplifier or network element. By monitoring the mechanical fiber stress for each individual fiber span, FS, and recording the instances when a predetermined delay threshold has been reached (thus indicating a critical mechanical fiber stress) on a span-by-span basis allows a network operator to determine which fiber span, FS, of the optical link, OL, connecting network elements A, B is causing a degradation in transmission performance of the WDM system. For instance, if such events or situations with critical mechanical fiber stress occur repeatedly, the operator of the network is able to localize a fault of a specific fiber span FS and can act before the fiber stress leads to a fiber cut. FIG. 3 shows an exemplary embodiment specific to OSC. Other embodiments are possible. With the method according to the present invention any signal other than the WDM channels or the OSC channel can be used. The only requirement for the signal is to be time modulated in order for the receiver to be able to detect the shift of its phase. For instance it is possible to use a separate wavelength which is not necessarily the same one used for OSC, the separate wavelength signal can be implemented with optimized modulations for improved resolutions or accuracy for phase measurement for fiber stress detection.

As shown in FIG. 3, a mechanical disturber, MD, exerts mechanical stress on the fibers of fiber span FS3. Each optical amplifier, OAi, in the optical supervisory channel, OSC, can be dropped and added as illustrated in FIG. 3. The mechanical stress caused by the mechanical disturber, MD, leads to a critical fiber stress or event which can be recorded in a logfile of an apparatus 2 according to the present invention. A mechanical stress of an optical fiber span, FS, can be detected at a receiver. In a possible embodiment, the receiver is located at a data network element such as data network element B illustrated in FIG. 3. This receiver comprises an apparatus 2 for monitoring mechanical fiber stress as illustrated in FIG. 2. In a further possible embodiment, the apparatus 2 for monitoring a mechanical fiber stress according to the present invention as illustrated in FIG. 2 can also be connected to one or several optical amplifiers $OA_i$ to monitor an optical supervisory channel, OSC. In a still further possible embodiment, the apparatus 2 for monitoring mechanical fiber stress of optical fiber spans within an optical network 1 can also be integrated in one or several optical amplifiers, OAi, of an optical fiber link, OL, connecting two data network elements, A, B, of the optical networks. Alternatively, the apparatus 2 is integrated at the receiving side, for instance in data network element B as illustrated in FIG. 3 and adapted to evaluate one or several optical supervisory channels, $OSC_i$. In an alternative embodiment, the optical signal monitored by the receiver of apparatus 2 according to the present invention is not transported in an optical supervisory channel, OSC, but in a conventional wavelength division multiplexing channel, WDM. If the monitored mechanical fiber stress becomes critical indicating a possible fiber cut, the control plane, CP, of the optical network 1 can be notified by the receiver and switch data traffic away from the detected signal path, SP, comprising the optical link, OL, with the affected optical fiber span, FS, to a protection signal path, PSP. The result of this fast switching is a lower amount of data loss as a result of a fiber cut if it happens. In a still further possible embodiment, if a critical mechanical stress indicating an imminent fiber cut is detected, the control plane, CP, of the optical network 1 can take actions to avoid the effects of the imminent fiber cut. The method which is provided to detect a fiber cut can also be used to detect an abnormal mechanical stress which could adversely affect the transmission performance of the WDM system, potentially leading to a fiber cut in the future. In a possible embodiment, several instances of mechanical fiber stress are recorded which subsequently are evaluated to address the root cause of the fiber stress events.

In a first step S1, the timing phase of a received optical signal transported through optical fiber spans is monitored continuously. In a further step S2, a mechanical fiber stress in the optical fiber spans is derived or calculated on the basis of an observed phase shift of the timing phase within a predetermined observation period of time.

Figure 5:
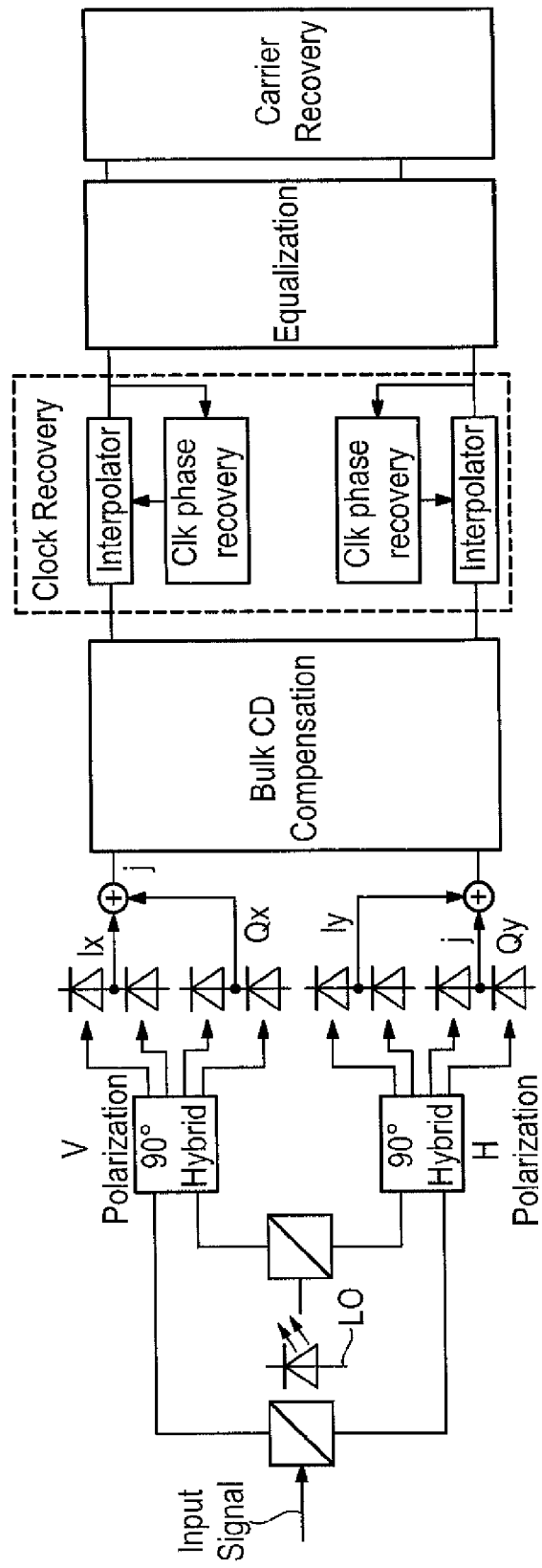
FIG. 5 shows a block diagram of a possible embodiment of a receiver as employed within a network according to the present invention.

In a possible embodiment, the apparatus 2 for monitoring mechanical fiber stress according to the present invention as shown in FIG. 2 can be integrated in an optical coherent receiver as illustrated in FIG. 5. The receiver 5 comprises a clock recovery block receiving optical signals transported through optical fiber spans. The timing phase of the received optical signal is extracted by the clock recovery block of the receiver. The monitoring unit $2a$ integrated in the receiver as shown in FIG. 5 is adapted to monitor continuously the timing phase of the received optical signal. The monitoring unit $2a$ continuously monitors a gradual phase shift that is equivalent to a delay in the order of several symbols taking place in a period of time that can be in a possible implementation less than 500 msec which is a typical duration of a fiber cut incident or fiber cut event. The number of the symbols does depend on the Baud rate of the received optical signal. In case that a phase shift is encountered, the calculation unit $2b$ can make the conclusion that there is a fiber cut incident which can be optionally further confirmed by evaluating further indicators including chromatic dispersion, polarization mode dispersion, bit error rate, BER, of the received optical signal, the optical signal power of the received optical signal to noise ratio, the phase shift of other WDM channels sharing the same path or a polarization dependent loss. Once the calculation unit $2b$ of the apparatus 2 integrated in the receiver has confirmed that a fiber cut incident is in progress, it can request a control plane, CP, of the optical network 1 to take actions that does guarantee that the data traffic is switched away from that particular optical link, OL, without losing any data packets. The control plane, CP, of the optical network 1 can chose any strategy in this case for switching the data traffic away from the affected optical link, OL. In a possible embodiment, the control plane, CP, can use the OSPF-TE protocol to perform a graceful shutdown of the affected signal path, SP, where the signal path, SP, will be announced to have a zero bandwidth in order to guarantee that no new LSPs are established. Afterwards, the control plane, CP, can request the existing LSPs on that signal route to move to a different signal path. Alternatively, the control plane, CP, of the network 1 can switch the data traffic to a protection signal path, PSP, in case of 1+1 or 1:N protection, if the start-up time for that signal path is sufficiently short.

The clock recovery block of the receiver illustrated in FIG. 5 is provided to extract a timing phase of the received optical signal in order to resample the signal at the correct sampling instances. Regardless of the algorithm employed in the clock recovery block, the phase value delivered by this clock recovery block can be used to measure a delay to the received optical signal that is caused by mechanical tension on a transmission optical fiber. The amount of delay is directly proportional to the level of tension taking place on the optical fiber or fiber span, FS, and therefore its quantity can be used to discover the fiber links that are at a high risk of being cut.

In a possible embodiment, the timing phase of the received optical signal is continuously monitored and observed changes to the phases are reported to derive the mechanical stress in the optical fiber spans, FS, on the basis of the observed phase shift. Alternatively, a phase difference of the received optical signal is measured against a fixed reference signal over a sample interval to provide a phase shift represented by a time difference between the received optical signal and the reference signal.

Figure 6:
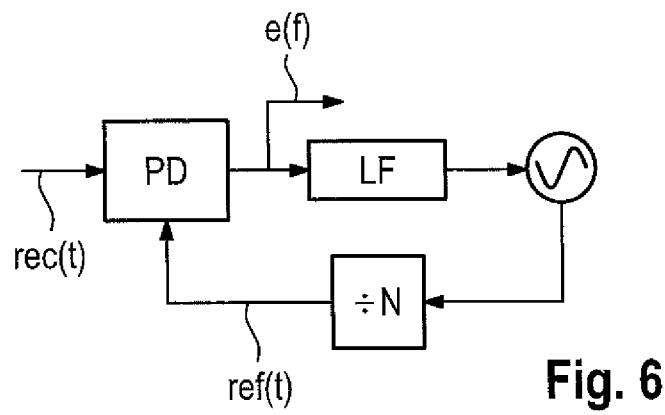
FIG. 6 shows a block diagram of a circuit for illustrating a possible embodiment of the method and apparatus according to the present invention.

FIG. 6 shows a block diagram of a phase locked loop, PLL, which can be used to monitor a phase offset of an incoming optical signal. In the embodiment shown in FIG. 6, the recovered signal rec(t) is applied to a phase detector, PD. The time constant of a following loop filter, LF, is established to hold a phase of a reference signal ref(t) for at least twice the desired measurement period of the break detection interval.

Figure 7:
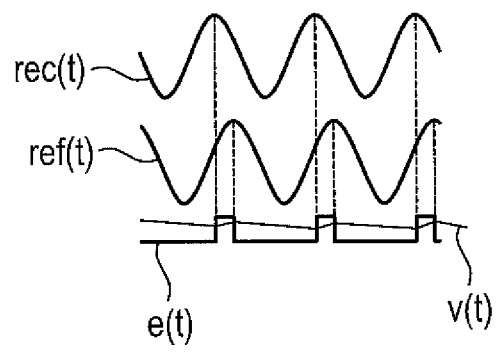
FIG. 7 shows signal diagrams for illustrating an operation of the circuit shown in FIG. 6.

FIG. 7 shows signal diagrams of the recovered signal and the reference signals as well as an error signal, e(t), output by the phase detector, PD. As this phase of the received optical signal rec(t) begins to shift during a fiber mechanical stress event, the signal phase of the reference signal ref(t) is maintained over the measurement interval resulting in an error signal e(t) that represents the phase shift of the recovered signal rec(t). The error signal e(t) can also be represented as a voltage that can be used as a threshold monitored to detect a pending cut or break event.

An ideal error signal e(t) can be represented as follows:

$$e(t) = e0 + \frac{\Phi(t)rec - \Phi(t)ref}{2\pi f_n} \quad (1)$$

where
$\Phi(t) = 2\pi f_n t$
and
$f_n$ is the nominal rate of the signal.

In an alternative implementation of measuring the phase offset, a time interval error signal, x(t), is defined as follows:

$$x(t) = x0 + \frac{[\Phi(t1+\Delta)rec - \Phi(t1)rec] - [\Phi(t1+\Delta)ref - \Phi(t1)ref]}{2\pi f_n} \quad (2)$$

In this implementation, the phase difference is measured against a fixed reference signal over a sample interval lasting for example 1 ms. The error signal is represented as a time difference between the reference and the incoming reception signal and can be accumulated over multiple sample intervals to determine a threshold for fiber overstress conditions.

The method according to the present invention is also suitable for constant monitoring of a system performance, wherein a maximum deviation of time error is recorded over longer performance monitoring periods thereby reporting the long-term health of the respective transmission medium.

The optical fiber communication of the optical network 1 as illustrated in FIG. 1 is based on transmitting optical signals through fiber spans of above ground or underground-buried optical fibers. These optical fiber links, OL, of the optical network can run through different geographical areas and consequently they are often subject to mechanical disturbances that, in some cases, can be very aggressive, and which might even lead to a fiber cut. For example, excavation activities over a buried optical fiber cable can lead to a fiber cut of the respective optical fiber link, OL.

Figure 8A:
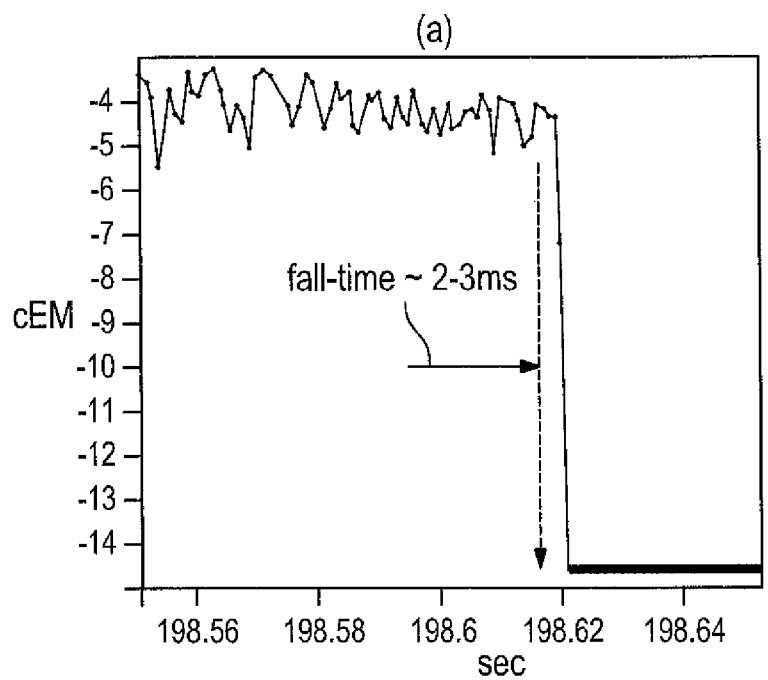
FIG. 8A, 8B, 8C show exemplary diagrams of fiber cut incidents in the field for illustrating the operation of the method and apparatus according to the present invention.
Figure 8B:
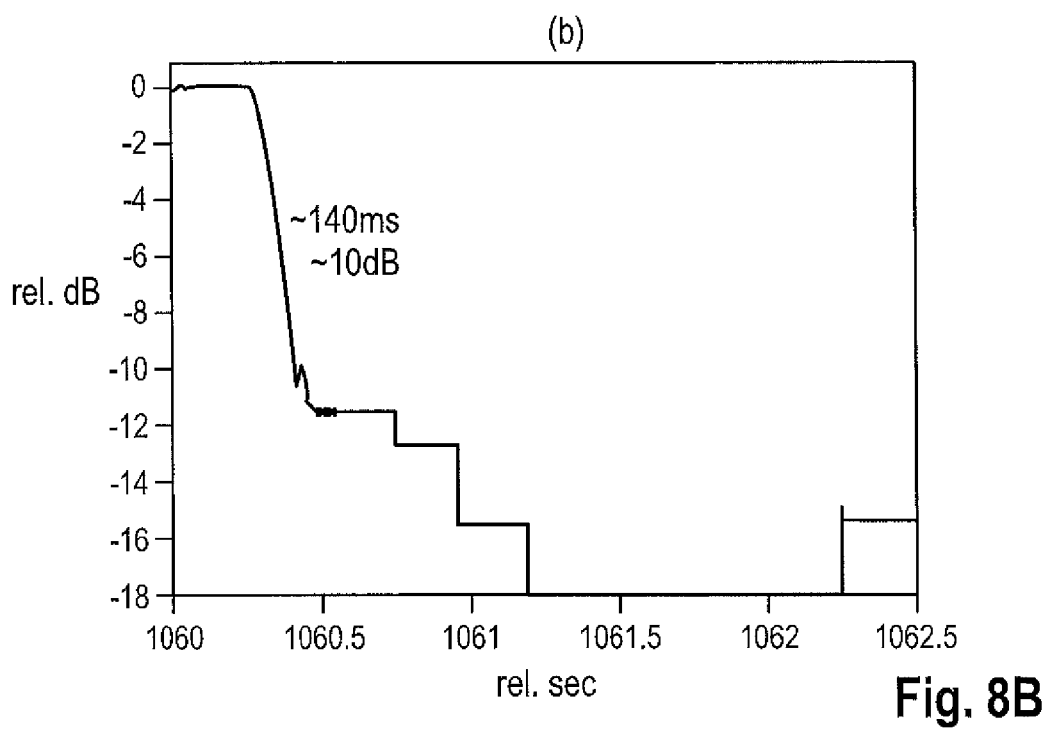
Figure 8C:
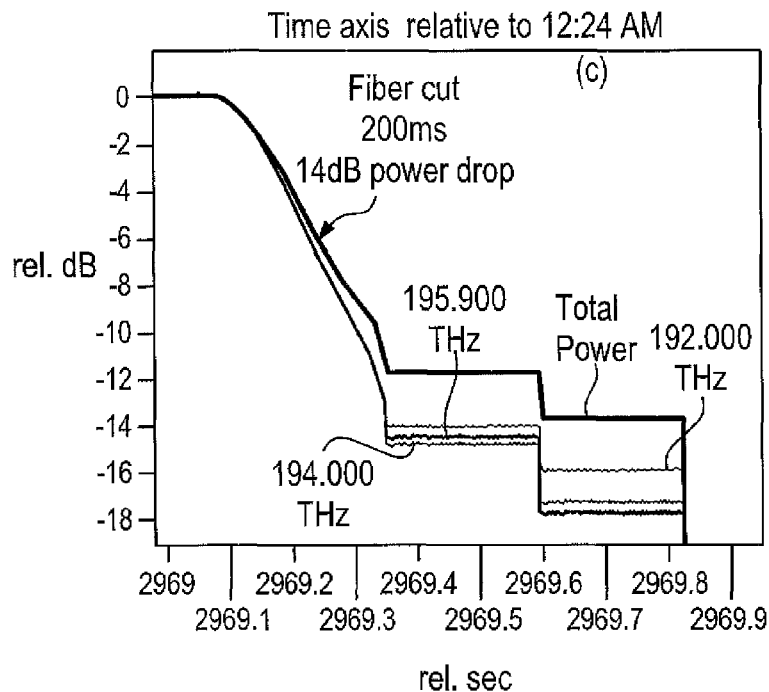

FIGS. 8A, 8B, 8C show examples for fiber cut events in the field. As can be seen, a fiber cut process can be relatively fast and on average takes a time between 100 μs and 500 ms. FIGS. 8A, 8B, 8C plot the optical power of the received optical signal as a function of time. In case of a fiber cut, all of the optical channels carried on the respective fiber cable are interrupted which represents a worst-case scenario for a telecommunication service provider who is obliged to provide highly reliable communication channels for his customers. With the method and apparatus according to the present invention it is possible for the service provider to monitor the optical transmission links. With the method and apparatus according to the present invention, parameters reported by an optical receiver are evaluated to indicate a level of mechanical tension or stress on an optical fiber and to subsequently predict optical links, OLs, that are at a high risk of being cut. A fast and reliable mechanism to alert a fiber cut in progress can be used by the network management software of the service provider to switch the data traffic channels being at risk of being cut to an alternative route or protection signal path, PSP, before rather than after the fiber cut has occurred. Accordingly, with the method and apparatus according to the present invention, a preemptive switching can reduce or eliminate a data loss caused by a fiber cut when compared to a conventional procedure currently in use.

Figure 4A:
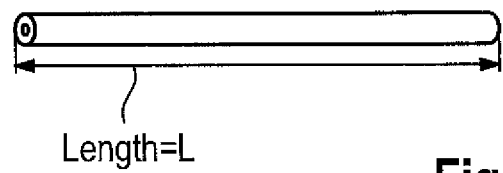
FIG. 4A, 4B show a diagram for illustrating the expansion of an optical fiber due to mechanical stress to illustrate the operation of the method and apparatus according to the present invention.
Figure 4B:
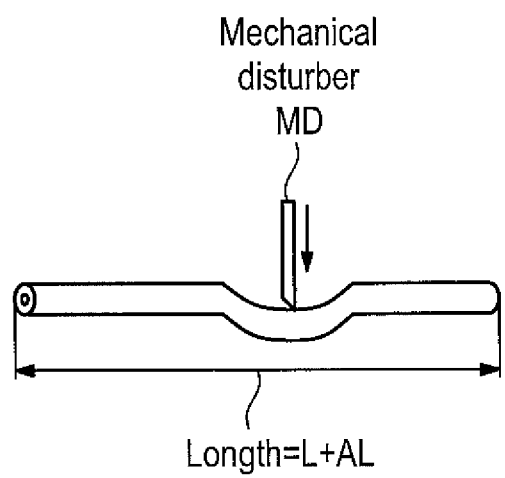

FIGS. 4A, 4B show a diagram for illustrating the expansion of an optical fiber due to mechanical stress caused by a mechanical disturber, MD. As can be seen in FIG. 9B, the mechanical tension increases the propagation time of the optical signal transmitted through the optical fiber. FIG. 9A illustrates an optical fiber without any mechanical stress. FIG. 9B shows a mechanical fiber subject to mechanical stress.

The travelling time of a signal transmitted through the optical fiber without stress is:

$$\text{Travelling time} = \frac{L}{\text{Speed of Light in Fiber}},$$

wherein L is the length of the fiber.

The travelling time of the signal in the optical fiber subject to mechanical stress is:

$$\text{Travelling time} = \frac{L + \Delta L}{\text{Speed of Light in Fiber}}$$

wherein L represents the length of the fiber without mechanical stress and ΔL is the additional length caused by the mechanical stress.

For a conventional optical telecommunication fiber, roughly a strain of 1% is caused by a load of 100 kpsi (kilo pound per square inch). If an optical fiber with a length L is strained by 1%, its length increases by 1% and so does the signal transmission time.

Figure 9:
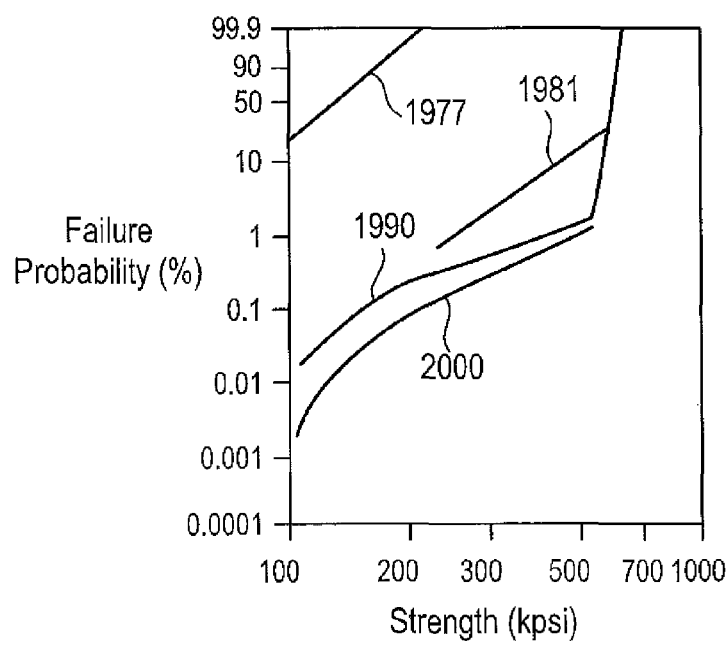
FIG. 9 shows a diagram for illustrating fiber failure probability as a function of an applied mechanical stress to illustrate the operation of the method and apparatus according to the present invention.

FIG. 9 illustrates a diagram showing a failure probability of an optical fiber as known to a person skilled in the art and published in "Specialty optical fibers handbook", Academic Press, 2011, p 751, Mendez, Alexis, and Ted F. Morse. As can be seen, the failure probability of an optical fiber is below 1% for any tension level that is below 500 kpsi. Accordingly, a fiber section of an optical fiber with a length L must expand roughly by 5% before breaking down. For example, if a one meter section of a buried optical fiber has experienced a tension of 500 kpsi, its length, L, will be increased by around 5 cm. For instance, for a 120 Gb/sec DP-QPSK signal having a Baud rate of about 30 GBaud, this translates into a time delay of approximately 7.5 symbols taking place within a time period of less than 500 ms. This time delay can be observed by the apparatus 2 according to the present invention.

A force of 100 kpsi applied to a certain optical fiber results in a strain of 1%. The relationship between strain and the strength of the force applied to the fiber is almost linear and can be represented as:

Strain (%)=Strength[kpsi]/100

The length, L, of an optical fiber subject to an X % strain increases by X %*L, wherein L is the length of the fiber section that is under tension. Consequently, the relationship between the stretch of fiber length and the level of applied mechanical strength is linear as well and can be written as:

$\Delta L = L \times \text{strength[kpsi]} \times 10^{-4}$.

This linear relationship is maintained until the strength level is in excess of 500 kpsi, where the probability of a fiber to break increases significantly.

For example, if a 1 m section of a certain optical fiber is subject to a force of 300 kpsi (strain=3%), its length, L, is increased by: $1 \times 300 \times 10^{-4} = 0.03$ [m]. Since the speed of light in an optical fiber is approximately $c/1.48 = 2.02 \times 10^8$ m/s, wherein c is the speed of light in vacuum, the signal propagating through the fiber section does experience an extra delay of $\Delta\tau = 0.03$ [m]/$2.02 \times 10^8$ [m/s]=148 ps.

Similarly, for example, if an optical signal is delayed by approximately 200 ps, the receiver can interpret that a 400 kpsi strength has been applied to the 1 m optical fiber section.

If the strength level increases to about 500 kpsi, the probability of breaking the fiber does increase significantly as shown in FIG. 9. Therefore, if the receiver measures a delay $\Delta\tau = 250$ ps, it can detect that the 1 m optical fiber section under tension is about to break. Other parameters can be used as well to measure the amount of delay of the signal at the receiver side. For instance, for a 30 GBaud optical signal, a delay $\Delta\tau = 250$ ps is equivalent to a phase shift of 46.5 radians or a shift of 7.5 symbols.

The delay ($\Delta\tau$) is a function of the length L of the fiber section under tension. Since typical values for the length L are in the order of few meters in the case of having an excavation activity on the fiber, the receiver is adapted to set a certain threshold, TH, on the signal delay (or similarly, the phase shift) that can be used to predict an imminent fiber cut. This threshold, TH, can be crossed within a time interval of ≤200 ms, which is typically the maximum duration for a fiber cut incident.

Figure 10:
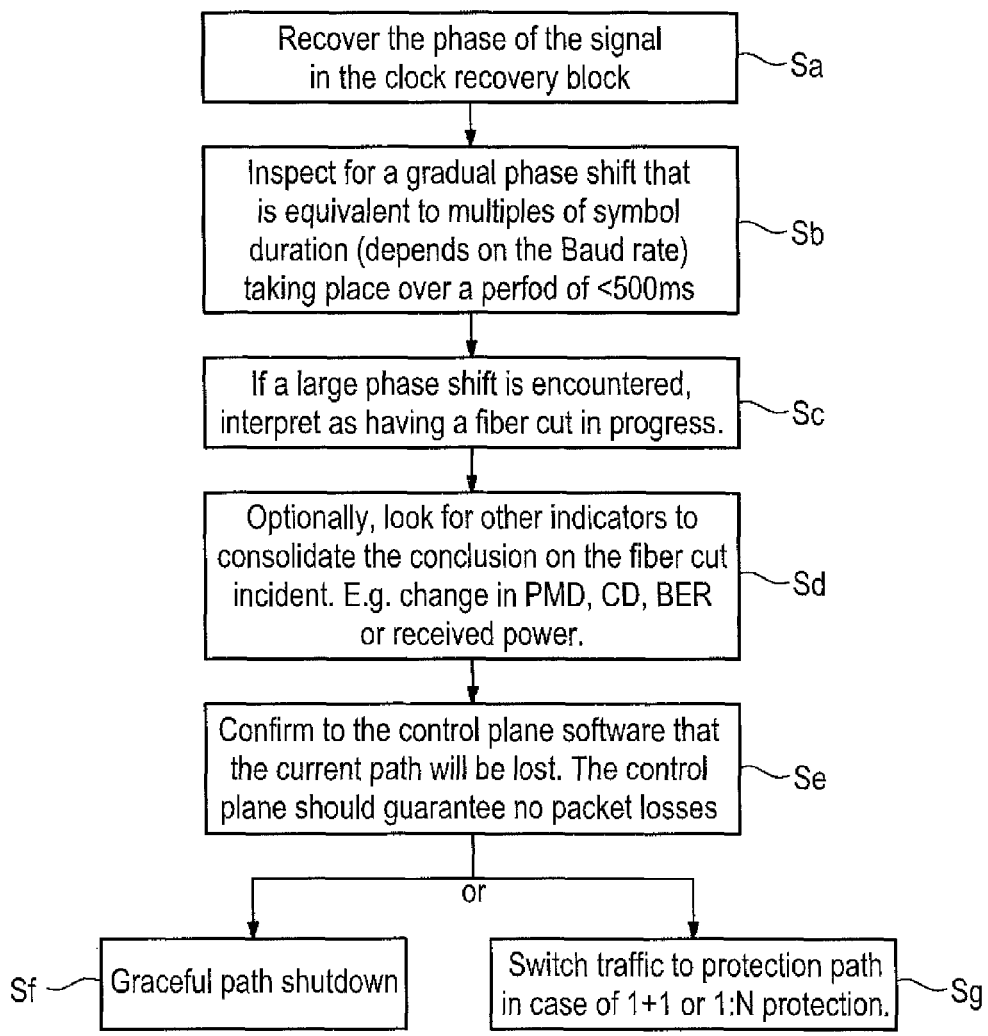
FIG. 10 shows a flowchart of a possible embodiment of the method according to the present invention.

FIG. 10 shows a flowchart of a possible exemplary embodiment of the method according to the present invention. In a first step, Sa, the phase of this received signal is recovered in the clock recovery block of the receiver. Then, in a further step Sb, a gradual phase shift that is equivalent to multiples of the symbol duration (which depends on the Baud rate) taking place over a period of time that is less than 500 ms is inspected.

If a large phase shift is encountered in step Sc, this is interpreted as having a fiber cut in progress.

In a further optional step Sd, the apparatus looks for other indicators to consolidate the conclusion on the incident fiber cut. These additional indicators which are evaluated to consolidate that the expected imminent fiber cut can comprise a bit error rate, BER, SNR, or the phase shift of other WDM channel sharing the same path of the received optical signal, a chromatic dispersion, a polarization mode dispersion, the optical signal power of the received optical signal and a polarization dependent loss.

In a further step Se, it is confirmed to the control plane software of the network 1 that a current signal path, SP, will probably be lost. The control plane, CP, is provided to guarantee that there are no packet losses. Accordingly, in a further step, the control plane, CP, can either perform a graceful signal path shutdown (step Sf) or switch data traffic to a protection signal path, PSP, of the network 1 (step Sg).

The idea underlying the method and apparatus according to the present invention is based on the fact that the length, L, of the optical fiber section under tension expands by a certain amount that is proportional to the level of tension applied to it. The optical receiver can perform a DSP algorithm to the received signal. The method according to the present invention can be implemented in any optical receiver type, for instance in an optical coherent receiver. Monitoring the variations in the phase of the arriving signal using the information of the clock recovery block allows to discover a fiber that is subject to a certain level of mechanical tension. With the method and apparatus according to the present invention it is possible to protect optical communication channels against failures in an optical transmission fiber that are caused by any kind of mechanical disturbances. With the method and apparatus according to the present invention, it is possible to discover fiber links that are about to be cut, for example due to excavation activities and to send a corresponding message or notification. This message or notification can be sent for example to a control plane, CP, of the network 1 in order to reroute the optical channels to different optical links, OL.

The method and apparatus according to the present invention allow a simple implementation requiring no extra software blocks or complicated DSP algorithms. Further, the method according to the present invention is generic to any optical signal and any link type, i.e. aerial or buried and any receiver type and any signal type as long as it is time modulated. With the method and apparatus according to the present invention it is possible to detect an optical fiber cut and to start the channel restoration process even before having any degradation of the signal quality, e.g. increased BER. This capability is very significant for modern high-capacity optical links, OLS, where BER margins are reduced significantly in order to compensate for higher OSNR requirements (OSNR: Optical Signal to Noise Ratio) of the high-speed optical signals.

The invention claimed is:

1. A method for monitoring mechanical fiber stress of optical fiber spans within an optical network comprising:
   monitoring continuously a timing phase of a received optical signal transported through said optical fiber spans;
   deriving the mechanical fiber stress in said optical fiber spans on the basis of an observed phase shift of said timing phase within a predetermined observation period of time,
   wherein the timing phase of the received optical signal is extracted by a clock recovery block of a receiver receiving said optical signal transported through said optical fiber spans.

2. The method according to claim 1,
   wherein a critical mechanical fiber stress indicating an imminent fiber cut is detected if the observed phase shift of said extracted timing phase exceeds a first threshold value within the predetermined observation period of time.

3. The method according to claim 2,
   wherein if an observed phase shift of said timing phase within the predetermined observation period of time exceeds said first threshold value then other indicators are evaluated to confirm an imminent fiber cut in said optical fiber spans.

4. The method according to claim 3,
   wherein the other indicators comprise
   a bit error ratio, BER, of said received optical signal,
   a chromatic dispersion,
   a polarization mode dispersion,
   an optical signal power of the received optical signal,
   a polarization dependent loss, a signal to noise ratio (SNR) and/or the phase of other WDM channels going through the same transmission link.

5. The method according to claim 1,
   wherein if a critical mechanical stress in one of the optical fiber spans of an optical link between two network elements of said optical network is detected a message or notification is sent by said receiver to switch data traffic away from the affected path comprising the optical link with the affected optical fiber span to a protection signal path or to perform a shutdown of the affected signal path comprising the optical link with the affected optical fiber span.

6. The method according to claim 2,
   wherein a critical mechanical stress in the affected optical fiber span of an optical link between two network elements of said optical network is detected if an observed phase shift is equivalent to a delay of several data symbols within a predetermined period.

7. The method according to claim 1,
   wherein the optical signal is transported through said optical fiber spans in a wavelength division multiplexing, WDM, channel.

8. The method according to claim 1,
   wherein the optical signal is transported through said optical fiber spans in an optical supervisory channel, OSC, and comprises a predetermined monitor wavelength.

9. The method according to claim 1,
   wherein instances of the monitored mechanical fiber stress for different optical fiber spans are recorded and evaluated to localize an affected optical fiber span of an optical link between network elements of said optical network.

10. The method according to claim 9,
    wherein the instances of the monitored mechanical fiber stress are recorded only if the observed phase shift of the extracted timing phase within the predetermined observation period of time exceeds a second threshold value.

11. The method according to claim 1,
    wherein the timing phase of said received optical signal is continuously monitored and observed changes to the phases are reported to derive the mechanical stress in said optical fiber spans on the basis of the observed phase shift.

12. The method according to claim 1,
    wherein a phase difference of said received optical signal is measured against a fixed reference signal over a sample interval to provide a phase shift represented by a time difference between the received optical signal and the reference signal.

13. An optical network comprising
    a plurality of network elements connected to each other via optical links each being composed of one or more optical fiber spans,
    wherein an extracted timing phase of a received optical signal transported through optical fiber spans of said optical network is continuously monitored and a mechanical stress in said optical fiber spans is derived on the basis of an observed phase shift of said extracted timing phase within a predetermined observation period of time,
    wherein the timing phase of the received optical signal is extracted by a clock recovery block of a receiver receiving said optical signal transported through said optical fiber spans.

14. The optical network according to claim 13,
    wherein the optical links comprise optical fiber spans connected to each other in series via optical amplifiers.

15. The optical network according to claim 13,
    wherein the monitored optical signal is an optical signal which is transported through said optical fiber spans in a wavelength division multiplex channel.

16. The optical network according to claim 13,
    wherein the monitored optical signal is a specific optical signal transported through said optical fiber spans in an optical supervisory channel and comprises a predetermined monitor wavelength.

17. An apparatus for monitoring mechanical fiber stress of optical fiber spans within an optical network said apparatus comprising:
    a monitoring unit adapted to monitor continuously a timing phase of a received optical signal transported through said optical fiber spans;
    a calculation unit adapted to detect a mechanical fiber stress in said optical fiber spans on the basis of an observed phase shift of the timing phase within a predetermined observation period of time: and
    a receiver adapted to receive said optical signal transported through said optical fiber spans and comprising a clock recovery block adapted to extract the timing phase of the received optical signal.

* * * * *